United States Patent
Biondi et al.

[11] Patent Number: 6,073,749
[45] Date of Patent: Jun. 13, 2000

[54] METHOD AND UNIT FOR CONVEYING PACKETS OF CIGARETTES

[75] Inventors: Andrea Biondi, Bologna; Fiorenzo Draghetti, Medicina, both of Italy

[73] Assignee: G.D Societa' Per Azioni, Pomponia, Italy

[21] Appl. No.: 09/127,263

[22] Filed: Jul. 31, 1998

[30] Foreign Application Priority Data

Aug. 1, 1997 [IT] Italy .................................. BO97A0477

[51] Int. Cl.$^7$ ................................................. B65G 47/24
[52] U.S. Cl. ............................ 198/417; 198/373; 198/408; 198/407; 198/406; 198/416; 198/418; 198/722; 198/723; 198/724
[58] Field of Search ..................................... 198/417, 416, 198/415, 418, 406, 407, 408, 373, 724

[56] References Cited

U.S. PATENT DOCUMENTS

| | | |
|---|---|---|
| Re. 20,530 | 10/1937 | Walker . |
| 1,250,047 | 12/1917 | Swanson . |
| 2,207,590 | 7/1940 | Lagaard . |
| 2,604,200 | 7/1952 | Hohl et al. ................................ 198/33 |
| 2,806,581 | 9/1957 | Rees . |
| 3,261,453 | 7/1966 | Hirs . |
| 3,412,884 | 11/1968 | Fischer . |
| 3,759,367 | 9/1973 | Elliott ...................................... 198/619 |
| 3,805,949 | 4/1974 | Engdahl et al. ...................... 198/481.1 |
| 4,031,764 | 6/1977 | Curtis .......................................... 74/57 |
| 4,550,821 | 11/1985 | Horie et al. ............................. 198/416 |
| 4,625,854 | 12/1986 | Deichmann et al. ................... 198/416 |
| 6,006,891 | 12/1999 | Iwano et al. ............................ 198/417 |

FOREIGN PATENT DOCUMENTS

| | | |
|---|---|---|
| 1128807 | 4/1962 | Germany . |
| 59-012012 | 1/1984 | Japan . |
| 59-163221 | 9/1984 | Japan . |
| 2096558 | 10/1982 | United Kingdom . |

OTHER PUBLICATIONS

Patent Abstracts Of Japan Of JP 59–163221 Of Sep. 1984.
Patent Abstracts Of Japan Of JP 59–012012 Of Jan. 1984.

*Primary Examiner*—Christopher P. Ellis
*Assistant Examiner*—Jeffrey A. Shapiro
*Attorney, Agent, or Firm*—Ladas & Parry

[57] ABSTRACT

A method and unit for conveying packets of cigarettes, whereby packets of cigarettes, supplied successively to an input of a guide, are transferred to an output of the guide by means of a screw device rotating about a respective axis of rotation; the guide winds 180° about the axis, and has two conducting elements located inside and outside the screw device to orient the packets with respect to the screw device.

18 Claims, 4 Drawing Sheets

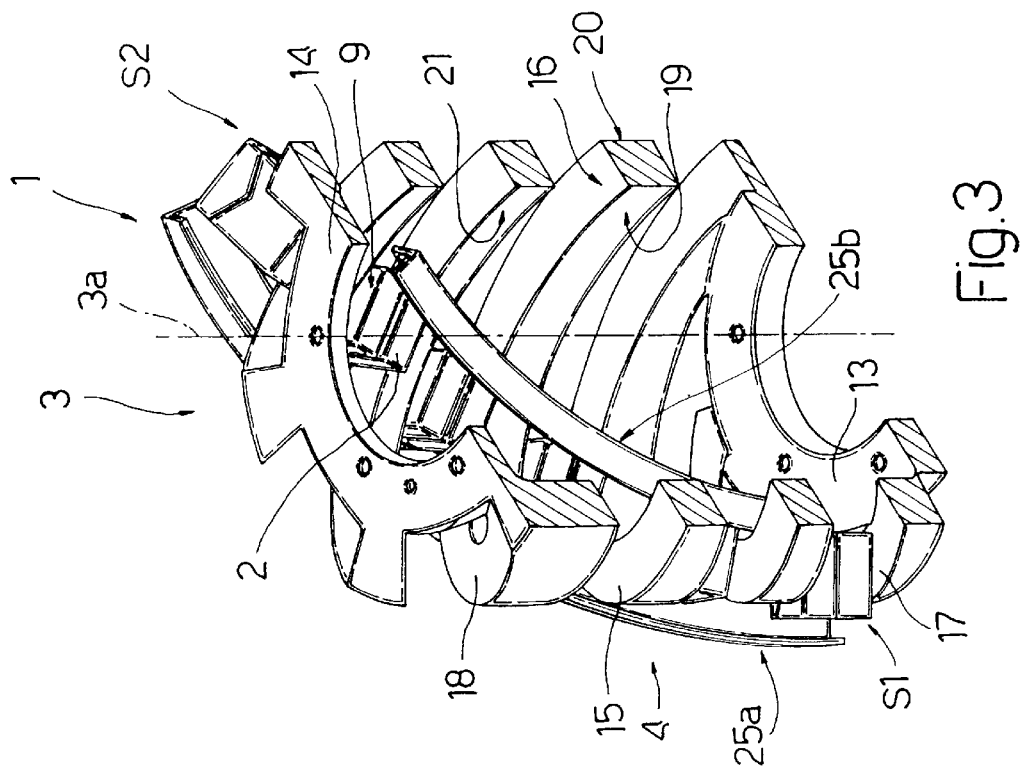
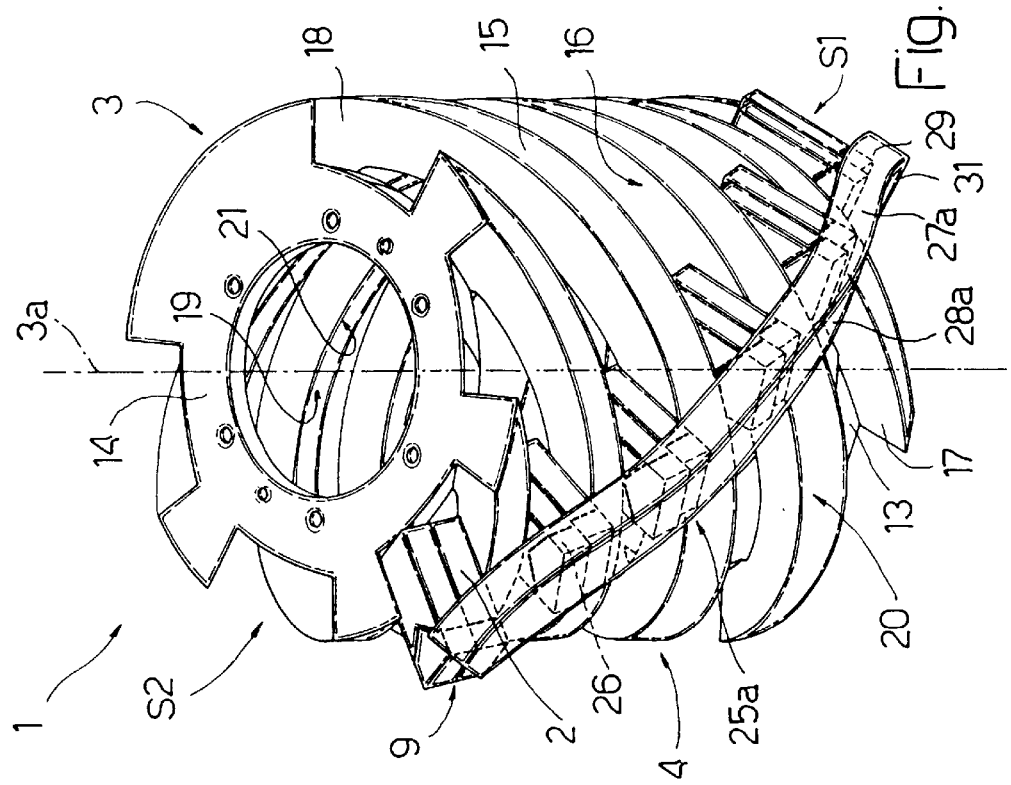

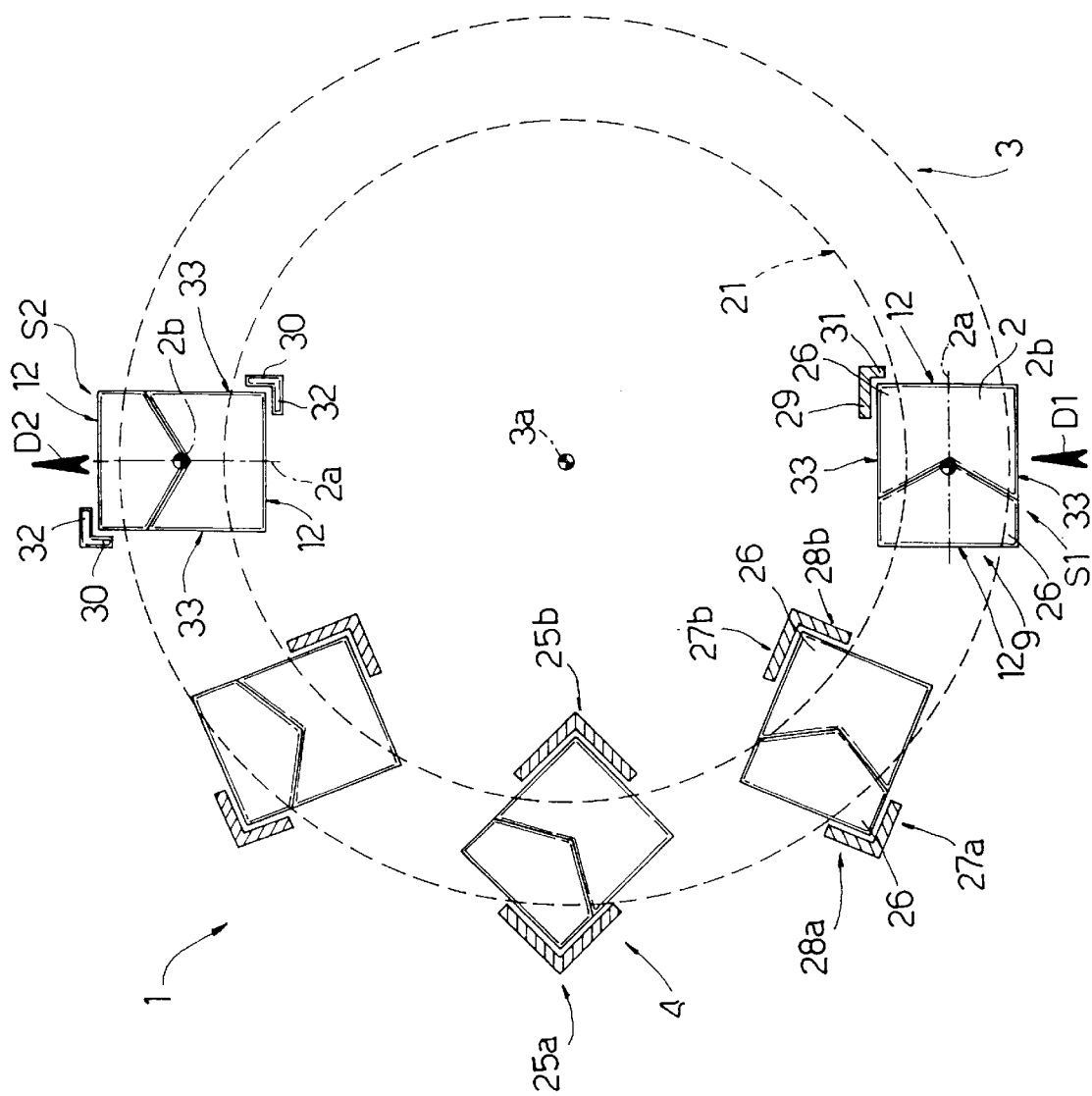

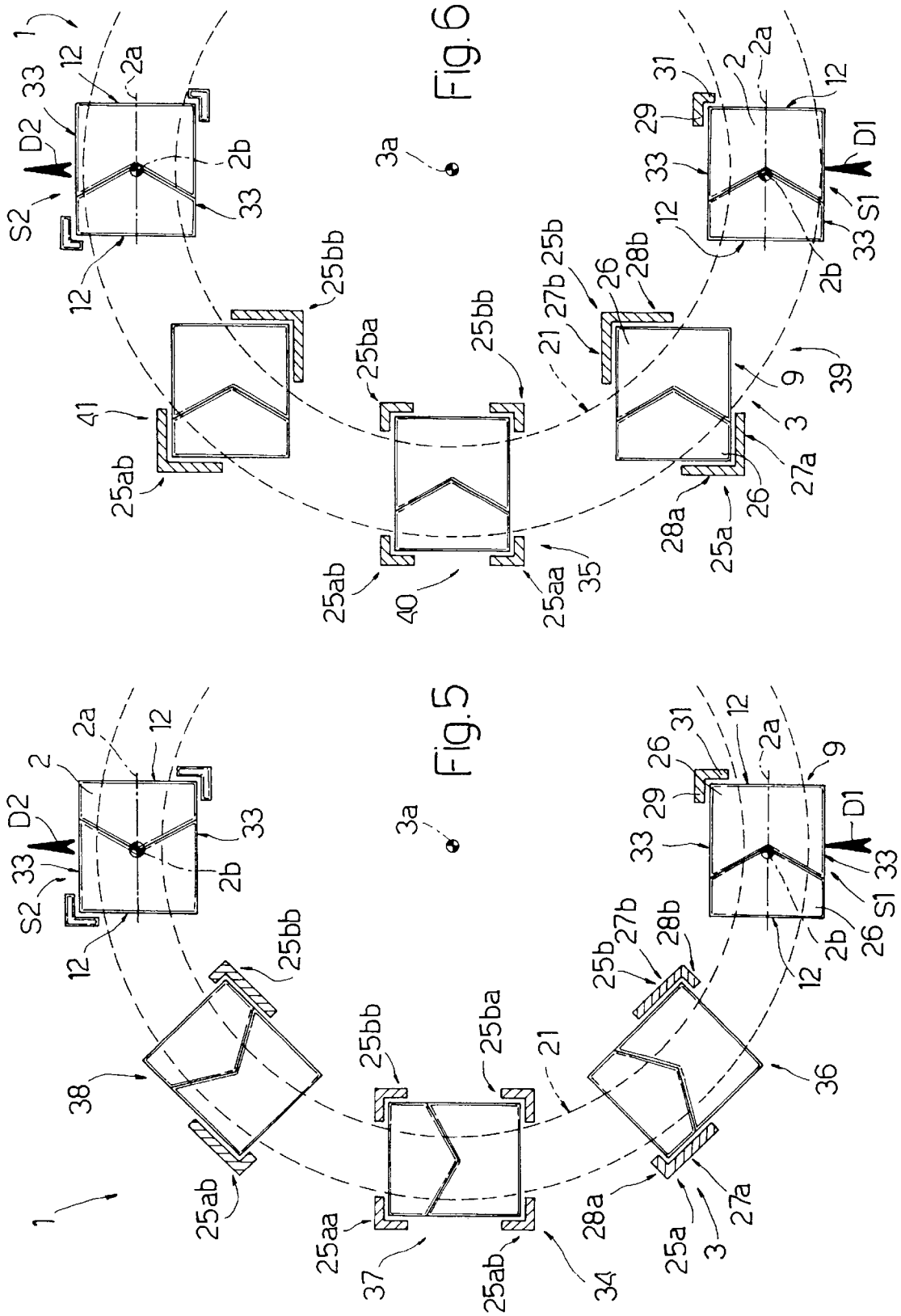

METHOD AND UNIT FOR CONVEYING PACKETS OF CIGARETTES

BACKGROUND OF THE INVENTION

The present invention relates to a method of conveying packets of cigarettes.

The present invention may be used to advantage for transferring packets of cigarettes from a cellophaning machine to a cartoning machine, to which the following description refers purely by way of example.

In cigarette packing systems comprising a cellophaning machine and a cartoning machine connected in series, the packets of cigarettes are fed between the two machines by means of a packet conveying unit comprising a screw transfer device rotating about an axis of rotation, and a guide which has an input and an output for the packets, is located outside the transfer device, and winds about the axis of rotation to cooperate with the transfer device to transfer the packets from the input to the output.

In known systems, the transfer device receives the packets laid flat with the respective end surfaces laterally facing the input of the guide, and comprises a substantially cylindrical core coaxial with the axis of rotation, at least one thread winding about the core, and an unloading conveyor belt device located at the output of the guide to extract the packets in a direction tangent to the thread, and so form a succession of packets with the respective end surfaces contacting one another.

Conveying the packets as described above involves several drawbacks, mainly on account of the operating and functional rigidity of the conveying unit. That is, in addition to requiring an unloading device to extract the packets of cigarettes as described above, a succession of packets such as the one described cannot be formed with the two machines arranged in line. Moreover, should operating changes require a different orientation of the packets at the output as compared with the input, substantially the whole conveying unit must be replaced with another specially designed for the purpose.

SUMMARY OF THE INVENTION

It is an object of the present invention to provide a method of conveying packets of cigarettes, which, besides eliminating the aforementioned drawbacks, is also highly flexible and both cheap and easy to implement.

According to the present invention, there is provided a method of conveying packets of cigarettes, the method comprising the steps of successively feeding packets of cigarettes to a guide by means of first input conveying means traveling in a first direction, the guide comprising an input for the packets communicating with the first input conveying means, and an output for the packets; successively transferring the packets from said input to said output by means of screw means having an axis of rotation; and successively feeding the packets from said output to second conveying means traveling in a second direction; the method being characterized by comprising the further step of orienting the packets with respect to said screw means and along said guide; and the guide comprising two conducting elements located radially inwards and outwards of the screw means.

The present invention also relates to a unit for conveying packets of cigarettes.

According to the present invention, there is provided a unit for conveying packets of cigarettes, the unit comprising a guide having an input for the packets and an output for the packets; first conveying means for successively feeding the packets to said input in a first direction; screw transfer means rotating about an axis of rotation to successively transfer the packets from said input to said output; and supply means for successively feeding the packets from said output to second conveying means traveling in a second direction; the unit being characterized by comprising orienting means for orienting the packets with respect to said screw transfer means and along said guide; and said guide comprising two conducting elements defining the orienting means and located radially inwards and outwards of the screw transfer means.

BRIEF DESCRIPTION OF THE DRAWINGS

The invention will now be described by way of examples with reference to the accompanying drawings, in which:

FIG. 2 shows a larger-scale view in perspective, with parts removed for clarity, of a detail in FIG. 1;

FIG. 3 shows a section of the FIG. 2 detail rotated 180° about an axis of rotation of the detail;

FIG. 4 shows, with parts removed for clarity, a succession of cross sections of the FIG. 2 detail in respective raised positions along the axis of rotation;

FIGS. 5 and 6 show, with parts removed for clarity, respective successions of cross sections of a further two preferred embodiments of the FIG. 1 unit in respective raised positions along the axis of rotation.

DETAILED DESCRIPTION OF THE INVENTION

Figure 1:
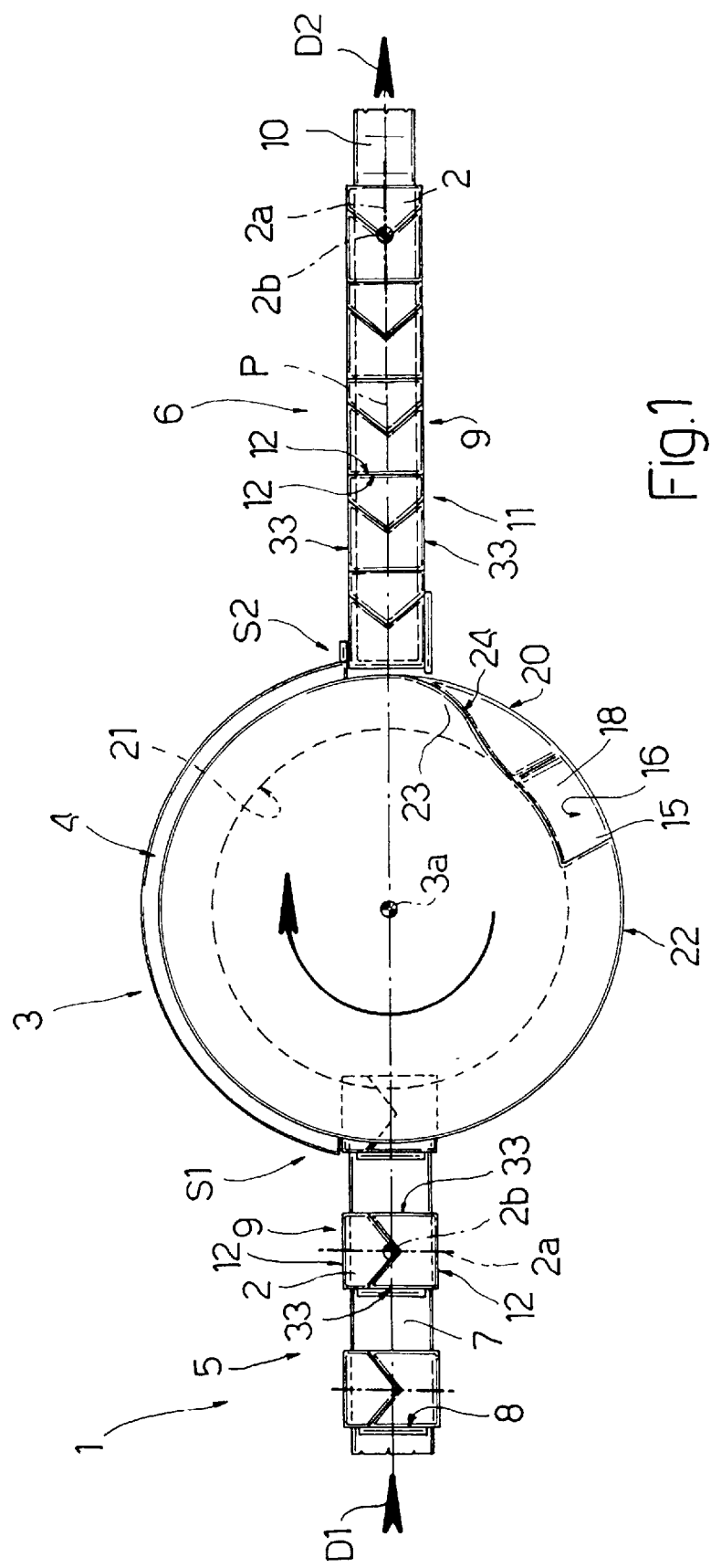
FIG. 1 shows a schematic plan view, with parts removed for clarity, of a first preferred embodiment of the conveying unit according to the present invention.

Number 1 in FIGS. 1–4 indicates as a whole a unit for conveying packets 2 of cigarettes along a straight conveying path P extending from a known cellophaning machine (not shown) to a known cartoning machine (not shown) in line with the cellophaning machine along path P.

Unit 1 comprises a screw transfer device 3 located along path P in a substantially intermediate position between said two machines; and a guide 4 associated with device 3 and having, for packets 2, an input S1 and an output S2 in series with each other and at different levels along path P. Device 3 and guide 4 cooperate with each other to feed packets 2 from input S1 to output S2 as described in detail later on.

Unit 1 also comprises a supply device 5 for supplying packets 2, and which extends along path P, between the cellophaning machine and input S1, to supply a succession of packets 2 to input S1 in a given traveling direction D1 and with a first given orientation wherein the respective major longitudinal axes 2a of packets 2 are crosswise to direction D1; and a further supply device 6 extending along path P, between output S2 and the cartoning machine, to receive packets 2 at output S2 with a second given orientation rotated substantially 90° with respect to the first orientation, and to feed packets 2 in a given traveling direction D2 parallel to direction D1 and with respective axes 2a parallel to direction D2.

Supply device 5 comprises a pocket conveyor 7 moving continuously along path P, and a number of pockets 8 equally spaced with a spacing K1, and each for supplying input S1 with two superimposed packets 2 forming a pair 9 of packets 2; while supply device 6 comprises a conveyor 10 moving in steps of length K2 equal to a whole multiple N of spacing K1, and which provides for receiving groups 11 of packets 2, and for feeding groups 11 to the cartoning machine. More specifically, each pocket 8 contains a pair 9 of packets 2 positioned with respective end surfaces 12—crosswise to respective axes 2a—parallel to direction D1 and projecting laterally from conveyor 7; while groups 11 are defined by an M number of pairs 9 of packets 2 positioned with respective surfaces 12 contacting one another, and with respective axes 2a parallel to one another and to direction D2.

Screw transfer device 3 is mounted for rotation about a vertical axis 3a, and comprises an annular bottom end 13 and an annular top end 14, both coaxial with axis 3a and separated by a distance, measured along axis 3a, substantially equal to the difference in level between input S1 and output S2; and a number of plates or threads 15 having a substantially rectangular cross section, and which connect ends 13 and 14 integrally to each other, and wind about axis 3a to define respective helical slide channels 16 engaged by pairs 9 of packets 2 which are further guided by guide 4.

As shown in FIG. 2, helical slide channels 16 are arranged as disclosed in European Patent Application No. 97119645.6 filed on Oct. 11, 1997, and are adapted to form groups 11 of packets 2, and to feed these groups 11 directly to conveyor 10 through output S2. To this end, the inputs of channels 16, which are equal in number to the number M of pairs of packets 2 forming each group 11, are uniformly distributed about axis 3a and along the whole periphery of device 3, whereas the outputs of channels 16 are uniformly distributed about axis 3a and along only a portion of the periphery of device 3 so as to provide for separating each group 11 in respect to the successive group 11.

Threads 15 have respective start and end portions 17 and 18 connected laterally to ends 13 and 14 respectively, and are each defined laterally by two coaxial cylindrical surfaces 19 and 20. Surface 19 is an inner surface, has a diameter substantially equal to the outside diameter of ends 13, 14, and defines a cavity 21 inside device 3; while surface 20 is an outer surface, is larger in diameter than surface 19, and, together with surface 19, determines a constant thickness of threads 15 along the whole of axis 3a. Channels 16 of transfer device 3 according to the present invention are therefore open both radially inwards and outwards of device 3, and communicate with cavity 21.

Finally, device 3 comprises a known actuating device (not shown) connected to end 13 to rotate device 3 continuously about axis 3a; and a passive unloading device 22 connected to end 14, and having, for each thread 15, a shaped radial wedge 23 with an outer surface 24 connected to surface 20 so as to reduce the thickness of thread 15 and unload the respective pair 9 of packets 2 from respective channel 16.

Guide 4 winds by an angle of 180° about axis 3a, so that input S1 and output S2 are located on opposite sides of axis 3a, is supported in a fixed position with respect to transfer device 3, and comprises two conducting elements 25 located radially outwards (25a) and inwards (25b) of threads 15, and which engage pairs 9 of packets 2 inside channels 16 to orient packets 2 with respect to device 3 as packets 2 are transferred from input S1 to output S2. More specifically, elements 25 are defined by respective L-shaped sections winding about axis 3a, are located directly facing surfaces 19 and 20, and engage respective opposite corner portions 26 of packets 2 to feed packets 2 along channels 16 from input S1 to output S2. The open configuration of channels 16 enables portions 26 of packets 2 to project both outwards and inwards of threads 15, to permit engagement of portions 26, in use, by conducting elements 25.

Each element 25 comprises two perpendicular wings 27 and 28 (indicated 27a, 27b and 28a, 28b) ; and wings 27a and 28a of element 25a extend laterally with respect to threads 15 and parallel to the corresponding wings 27b and 28b of element 25b inside cavity 21. Wing 27a is shorter than wing 27b to permit insertion of pairs 9 of packets 2 inside channels 16; and wings 27a and 27b have respective initial portions 29 tangent to respective surfaces 20 and 19 at least at input S1, and respective end portions 30 crosswise to respective tangents of respective surfaces 20 and 19 at output S2. The initial portion 29 of inner wing 27b is located substantially contacting end 13, and cooperates with end 13 as pairs 9 of packets 2 are inserted between threads 15; while the portion 29 of wing 27a is located higher, with respect to end 13, than portion 29 of wing 27b to permit insertion of pairs 9 of packets 2 into respective channels 16. Similarly, wings 28a and 28b have respective initial portions 31 crosswise to respective tangents of respective surfaces 20 and 19 at input S1, and respective end portions 32 tangent to respective surfaces 20 and 19 at output S2.

In other words, wings 27 and 28 substantially wind about axis 3a with a greater pitch than threads 15 and by an angle of substantially 180°, and at the same time wind about respective longitudinal axes to move packets 2 from the first to the second orientation by rotating packets 2 about respective axes 2b crosswise to respective axes 2a and parallel to axis 3a at least at input S1 and output S2.

In actual use, pockets 8 of conveyor 7 and start portions 17 of threads 15 are fed continuously and in time with each other through input S1 of guide 4, so that each pair 9 of packets 2 is engaged immediately by respective portion 17 as soon as pair 9 substantially contacts bottom end 13, which thus acts as a stop element for arresting pair 9 in direction D1.

At this point, each pair 9 is lifted from input Si and, guided partly by initial portions 29 and 31 of wings 27b and 28b, is inserted between conducting elements 25. As stated, initial portions 29 and 31 of wings 27b and 28b are located substantially contacting end 13, whereas initial portion 29 of wing 27a is higher with respect to end 13. Once the corner portions 26 of packets 2 in each pair 9 are inserted between wings 27 and 28 of both elements 25, packets 2, being engaged simultaneously inside channel 16 and guide 4, are fed from input S1 to output S2, i.e. are rotated 180° about axis 3a. At output S2, at the point in which elements 25 terminate, packets 2 in each pair 9 are engaged by shaped wedge 23 of respective channel 16, and are pushed radially outwards of device 3 by respective surface 24 to feed each pair 9 on to conveyor 10 and against the previously unloaded pair 9.

Once a group 11 of packets 2 is formed on conveyor 10, this is activated to feed group 11 in direction D2 to the cartoning machine.

The two elements 25 are so formed that, as packets 2 are transferred from input Si to output S2 of guide 4, the packets 2 in each pair 9 are rotated 90° about respective axes 2b, and are oriented with respect to threads 15 lifting packets 2 from input S1 to output S2. That is, when inserted between elements 25 substantially at input S1, packets 2 are positioned with respective surfaces 12 contacting wings 28, and with further small lateral surfaces 33, crosswise to surfaces 12, contacting wings 27. As packets 2 are fed along guide 4, elements 25 rotate packets 2 substantially 90° about respective axes 2b, so that, on reaching output S2, packets 2 are oriented with respective surfaces 12 crosswise to direction D2, and with respective surfaces 33 parallel to direction D2. In other words, unlike known screw transfer devices, in addition to transferring packets 2 from input S1 to output S2 of guide 4 by rotating packets 2 about the axis of rotation 3a of device 3, the orientation of packets 2 with respect to threads 15, i.e. with respect to device 3, is also changed. As such, packets 2 may be fed to output S2 with respective end surfaces 12 radially inwards and outwards of device 3, and groups 11 may be formed on conveyor 10 with no need for a further unloading device connected to device 3. Moreover, groups 11 may be formed from in-line packets 2 with the cartoning and cellophaning machines in line with each other along a straight path P, of which device 3 represents a change in level.

The FIG. 5 and 6 embodiments show two guides 34 and 35 substantially similar to guide 4, except that packets 2 are rotated 180° along guide 34 and 0° along guide 35.

More specifically, guide 34 receives packets 2 at input S1 with surfaces 12 parallel to direction D1, and feeds packets 2 to output S2 with surfaces 12 parallel to direction D2 but inverted with respect to the input. Guide 34 comprises an initial portion 36 defined by two conducting elements 25a and 25b of the type described previously and for engaging respective corner portions 26 of packets 2; a central portion 37 along which each conducting element 25a and 25b of portion 36 is duplicated to form two conducting elements 25aa, 25ab and 25ba, 25bb to engage all four corner portions 26 of packets 2; and an end portion 38 defined by the two new conducting elements 25ab and 25bb to engage the portions 26 of packets 2 formerly left free at input S1.

Along all three portions 36, 37 and 38, wings 27 of guide 34 remain substantially tangent to threads 15, while wings 28 remain crosswise to a tangent of threads 15. That is, unlike guide 4, guide 34 makes no change in the orientation of packets 2 with respect to threads 15, so that packets 2 rotate solely about axis 3a, and the orientation of the packets is only changed with respect to directions D1 and D2.

Guide 35 receives packets 2 at input S1 with surfaces 12 parallel to direction D1, and feeds packets 2 to output S2 with surfaces 12 parallel to direction D2 and arranged the same way as input S1. Guide 35 comprises an initial portion 39 defined by two conducting elements 25a and 25b of the type described previously and for engaging respective corner portions 26 of packets 2; a central portion 40 along which each conducting element 25a and 25b of portion 39 is duplicated to form two conducting elements 25aa, 25ab and 25ba, 25bb to engage all four corner portions 26 of packets 2; and an end portion 41 defined by the two new conducting elements 25ab and 25bb to engage the portions 26 of packets 2 formerly left free at input S1.

Along all three portions 39, 40 and 41, wings 27 of guide 35 remain crosswise to a tangent of threads 15, while wings 28 remain substantially tangent to threads 15. That is, unlike guide 34, guide 35 changes the orientation of packets 2 with respect to threads 15 by gradually rotating packets 2 by 90° about respective axes 2b, which, combined with the rotation of packets 2 about axis 3a, results in 0° rotation of packets 2 at output S2.

Unit 1 operates in exactly the same way with guides 34 and 35 as with guide 4 already described. It should be pointed out, however, that, though the cellophaning and cartoning machines remain in line along path P using guide 34 or 35, the groups (not shown) formed on conveyor 10 differ from groups 11 formed using guide 4, i.e. are defined by packets 2 contacting one another along surfaces 33 as opposed to surfaces 12. Unit 1 as described therefore provides not only for changing the configuration of groups 11 as required by simply changing conducting elements 25, but also for maintaining the cellophaning and cartoning machines in line regardless of the configuration of groups 11.

According to another embodiment (not shown), device 3 has a lower substantially frusto-conical portion and an upper cylindrical portion as shown in an embodiment disclosed in EP-A1-814038, and supply device 5 is no longer provided with transport pockets and is provided, at its output end, with a breaking and timing unit, of the type shown in U.S. Pat. No. 4,883,163 or in U.S. Pat. No. 5,287,954. Such breaking and timing unit is adapted to order at least part of the packets 2 located on supply device 5 in a succession where each packet 2 is arranged in contact with the adjacent packets 2, and to supply each packet 2 to device 3 in time with the input of the relevant channel 16.

We claim:

1. A method of conveying packets of cigarettes, the method comprising the steps of successively feeding packets (2) of cigarettes to a guide (4) by means of first input conveying means (5) traveling in a first direction (D1), the guide (4) comprising an input (S1) for the packets (2) communicating with the first input conveying means (5), and an output (S2) for the packets (2); successively transferring the packets (2) from said input (S1) to said output (S2) by means of screw means (3) having an axis of rotation (3a); and successively feeding the packets (2) from said output (S2) to second conveying means (6) traveling in a second direction (D2); the method being characterized by comprising the further step of orienting the packets (2) with respect to said screw means (3) and along said guide (4); and the guide (4) comprising two conducting elements (25) located radially inwards and outwards of the screw means (3).

2. A method as claimed in claim 1, characterized in that the packets (2) are fed in said first direction (D1) with a first orientation, and in the second direction (D2) with a second orientation rotated by a given angle with respect to the first orientation and about a respective axis of orientation (2b) parallel to said axis of rotation (3a).

3. A method as claimed in claim 2, characterized in that said packets (2) each have respective end surfaces (12) parallel to each other; said first input conveying means (5) conveying the packets (2) laid flat with the respective end surfaces (12) parallel to said first direction (D1).

4. A method as claimed in claim 2, characterized in that said given angle is substantially a right-angle.

5. A method as claimed in claim 3, characterized by comprising the further step of forming on said second conveying means (6) a succession of groups (11) of packets (2) arranged contacting one another at the respective end surfaces (12).

6. A method as claimed in claim 1, characterized in that said input (S1) and said output (S2) are located on opposite sides of said screw means (3); and said first and second directions (D1, D2) are radial directions with respect to said axis of rotation (3a) and parallel to each other.

7. A method as claimed in claim 6, characterized in that said input (S1) and said output (S2) are at different levels.

8. A method as claimed in claim 1, characterized in that said screw means (3) comprise at least one helical channel (16) along which said packets (2) are fed by the packets (2) simultaneously engaging the channel (16) and said guide (4); said channel (16) being open both radially inwards and outwards of the screw means (3) and said conducting elements (25) winding about said axis of rotation (3a) laterally and on opposite sides of the channel (16).

9. A method as claimed in claim 8, characterized in that said channel (16) is of a given depth, at least at said output (S2); the packets (2) being extracted from the channel (16) at the output (S2) by gradually reducing said depth.

10. A unit for conveying packets of cigarettes, the unit (1) comprising a guide (4) having an input (S1) for the packets (2) and an output (S2) for the packets (2); first conveying means (5) for successively feeding the packets (2) to said input (S1) in a first direction (D1); screw transfer means (3) rotating about an axis of rotation (3a) to successively transfer the packets (2) from said input (S1) to said output (S2); and supply means (22) for successively feeding the packets (2) from said output (S2) to second conveying means (6) traveling in a second direction (D2); the unit (1) being characterized by comprising orienting means (25) for orienting the packets (2) with respect to said screw transfer means (3) and along said guide (4); and said guide (4) comprising two conducting elements (25) defining the orienting means (25) and located radially inwards and outwards of the screw transfer means (3).

11. A unit as claimed in claim 10, characterized in that said input (S1) and said output (S2) are located on opposite sides of said screw transfer means (3); and said first and second directions (D1, D2) are radial directions with respect to said axis of rotation (3a) and parallel to each other.

12. A unit as claimed in claim 11, characterized in that said input (S1) and said output (S2) are at different levels.

13. A unit as claimed in claim 10, characterized in that said screw transfer means (3) comprise at least one thread (15) defining at least one helical channel (16) engaged by said packets (2); said channel (16) being open both radially inwards and outwards of the screw transfer means (3); and said conducting elements (25) winding about said axis of rotation (3a) laterally and on opposite sides of said channel (16).

14. A unit as claimed in claim 13, characterized in that said thread (15) winds about said axis of rotation (3a), and defines a cavity (21) inside said screw transfer means (3); one of said conducting elements (25) being located inside said cavity (21) to engage said packets (2) inside said channel (16).

15. A unit as claimed in claim 10, characterized in that said screw transfer means (3) comprise a screw (3) rotating about said axis of rotation (3a), and in turn comprising an inner cavity (21), and a number of threads (15) winding about the cavity (21) and defining respective helical channels (16) engaged by said packets (2); said channels (16) being open radially outwards, and communicating with said cavity (21); and said conducting elements (25) winding about said axis of rotation (3a) laterally and on opposite sides of said channels (16).

16. A unit as claimed in claim 15, characterized in that one of said conducting elements (25) is located inside said cavity (21) to engage a corner portion (26) of said packets (2) inside said channel (16).

17. A unit as claimed in claim 13, characterized in that said channel (16) is of a given depth, at least at said output (S2); said supply means (22) comprising extracting means (23) associated with said channel (16) to extract the packets (2) from the channel (16) at the output (S2) by gradually reducing said depth.

18. A unit as claimed in claim 10, characterized in that said conducting elements (25) wind about respective longitudinal axes.

* * * * *